(12) United States Patent
Losee

(10) Patent No.: US 6,927,675 B2
(45) Date of Patent: Aug. 9, 2005

(54) CIGARETTE LIGHTER MOUNTED REMOTE CAR ALARM

(76) Inventor: Timothy J. Losee, 1216-B Amethyst St., Redondo Beach, CA (US) 90277

( * ) Notice: Subject to any disclaimer, the term of this patent is extended or adjusted under 35 U.S.C. 154(b) by 197 days.

(21) Appl. No.: 10/624,309

(22) Filed: Jul. 22, 2003

(65) Prior Publication Data

US 2005/0017854 A1 Jan. 27, 2005

(51) Int. Cl.7 ............................................. B60R 25/10
(52) U.S. Cl. .................... 340/426.1; 340/541; 340/547; 340/551
(58) Field of Search ............................. 340/426.1, 541, 340/546, 547, 548, 551, 552, 565, 567, 426.18, 426.26

(56) References Cited

U.S. PATENT DOCUMENTS

| | | | | |
|---|---|---|---|---|
| 5,319,350 A | * | 6/1994 | DeMarco et al. ............ | 340/435 |
| 5,463,371 A | * | 10/1995 | Fuller .................... | 340/426.27 |
| 5,469,135 A | * | 11/1995 | Solow .................... | 340/426.31 |
| 6,587,047 B2 | * | 7/2003 | Nilsson et al. .............. | 340/554 |
| 6,631,096 B2 | * | 10/2003 | Gillis et al. .................. | 367/93 |
| 6,762,676 B2 | * | 7/2004 | Teowee et al. .......... | 340/426.1 |

* cited by examiner

Primary Examiner—Toan N. Pham
(74) Attorney, Agent, or Firm—Michael Bak-Boychuk

(57) ABSTRACT

A portable alarm system includes a cigarette lighter socket mount which is useful to deploy a flexible beam structure in cantilever. An electrical board mounted eccentrically from the other end of the beam structure then provides the torsional and bending motions that are inducted in the course of illegal entry, these motions then being sensed by tank circuits connected to corresponding comparators. The output of each comparator is then combined in a logical AND and OR combination that is manually selected by a switch to turn on a sending unit that then communicates with a remote device like a pager.

16 Claims, 2 Drawing Sheets

CIGARETTE LIGHTER MOUNTED REMOTE CAR ALARM

BACKGROUND OF THE INVENTION

1. Field of the Invention

The present invention relates to motor vehicle alarm systems, and more particularly to a portable alarm that may be installed in cantilever from the cigarette lighter outlet of a motor vehicle to issue a remote alarm signal upon the movement of the vehicle.

2. Description of the Prior Art

In today's multi-modal travel practices the short term use of rented or borrowed motor vehicles is an event that occurs with increasing regularity, with the trends all pointing to an even higher rate of temporary vehicle possession instead of permanent ownership. As the range of our travel distances increases temporary use of a motor vehicle at the remote destination is now a common event. This same distant travel, however, makes each one of us travelers a stranger and the already high incidence of vehicle theft and burglary is thus further increased by these temporary vulnerable settings. The victimized traveler is now a familiar sight and a frequent subject of various tales and jokes.

In the past various vehicle alarm systems have been devised, all however characterized by one or another mode of concealment to effectively resist those bent on theft or burglary, but it has been this concealed nature of the alarm that has led to its virtually universal rejection by those renting the car. At the end of a long flight, spanning many time zones, one simply does not have the time nor perseverance to learn some new and different alarm wrinkle and whatever alarm systems may be in the rental car are each simply relegated to inattention. Thus the complex activation and deactivation process of a strange alarm system in a strange, rented car has been universally rejected. Nonetheless, we each travel with a certain repertoire of significant personal articles which we don't want to lose and it is at this juncture that some alarm system is desired, particularly if the alarm system stays with us and therefore becomes well familiar in use which is further advanced by convenient installation in each vehicle rented. Such a portable alarm can very well become a part of our familiar set of personal travel accessories. Of course, also included is the recently evolved and now common wireless communication device that invariably forms a part of this accessory array.

In the past various alarm systems have been developed which in one way or another combine a vehicle alarm system with a wireless communication device. For example U.S. Pat. No. 5,819,869 to Horton describes a vehicle security system in which a remotely signaled receiver disables the vehicle after it is stopped, U.S. Pat. No. 5,463,371 to Fuller teaches a portable, window mounted and powered from cigarette lighter socket alarm system which can be remotely turned on and off by a remote transmitter and one need only visit the several teachings of U.S. Pat. No. 6,335,679 to Thomas, et al., U.S. Pat. No. 6,127,920 to Chen, U.S. Pat. No. 6,028,506 to Xiao, U.S. Pat. No. 6,028,505 to Drori, U.S. Pat. No. 5,543,776 to L' Esperance, et al. and many others for the various manners of cooperative interconnection between a car alarm system and a wireless communication device. While each is suitable for the purposes intended none, however, combine the spring-mass combination of the electronics of a fully portable alarm and sending unit with a cantilevered mount receivable in the ubiquitous cigarette lighter to produce both the mechanical sensing associated with vehicle intrusion that then also sets off a remote page. It is the synergistic conveniences of the combination of these two aspects that are now described.

SUMMARY OF THE INVENTION

Accordingly, it is the general purpose and object of the present invention to provide a portable alarm system including a sensing portion effected by the dynamic response of an elastic structure deployable in cantilever from the cigarette lighter socket of an automobile.

Other objects of the invention are to provide a wireless alarm signaling system in which the alarm condition is elastically sensed by the system sending unit mounted in cantilever from a cigarette lighter socket.

Further objects of the invention are to provide one or more tank circuits deployed on an elastic cantilevered beam in inductive proximity adjacent a fixed source of magnetic flux.

Yet further objects of the invention are to provide a portable car alarm that is conformed for convenient installation and removal.

Briefly, these and other objects are accomplished within the present invention by providing an accessory contact conformed as a mount insertable into a cigarette lighter socket usually found in a motor vehicle including a first elastic beam extending adjacent a second beam. The second beam may be provided with an electromagnetic piece aligned to pass its magnetic flux field into one or more inductive pick-ups mounted on an electronics board fixed eccentrically on the first elastic beam. Included also on the board are the corresponding reactive components associated with each inductor to form a tank circuit therewith each selected to resonate at the fundamental oscillation frequency of the beam-mass combination, both in torsional displacement and in bending. The induced resonating signal from each tank circuit is then passed through a corresponding bandpass filter, thereafter rectified and then compared in a corresponding comparator. The outputs of these comparators are then combined in a logical AND and OR which thus provide two levels of sensitivity that may be selected by the user. If the particular logical combination is then sensed a wireless communication device sends a remote signal to a pager indicating an alarm.

Those skilled in the art will appreciate that the foregoing implementation is essentially unpowered, and therefore inert, until inserted for contact into the lighter socket. Upon insertion the various modes of motion induced by this event and then by the exit movement of the user will generate a sequence of alarm signals that, because of their temporal proximity, are useful as verification that the whole alarm sequence is working, greatly simplifying the electronics task. In this manner an inexpensive, reliable and simple device is rendered useful in wide applications.

DESCRIPTION OF THE PREFERRED EMBODIMENT

Figure 1:
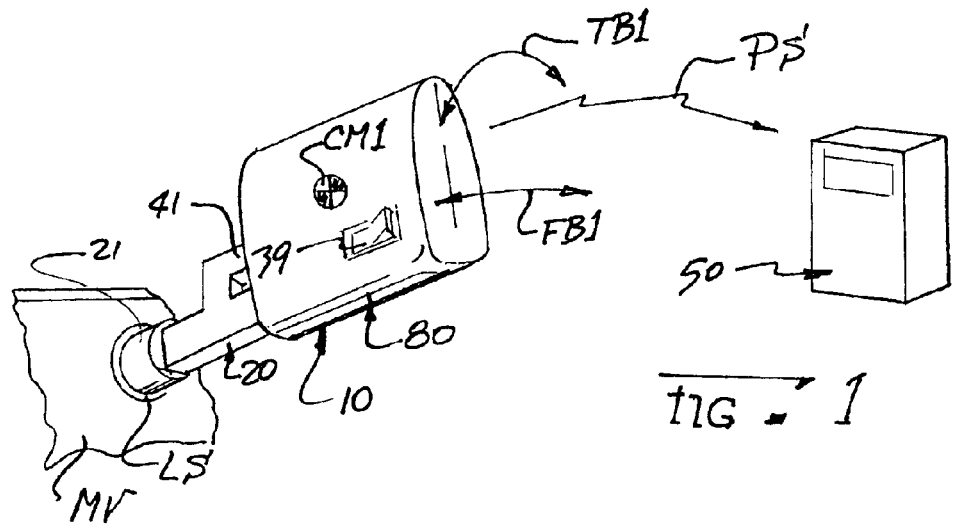
FIG. 1 is a perspective illustration of the inventive vehicle alarm system in its deployed mounting from a cigarette lighter socket of a motor vehicle and depicting the several modes of elastic motion effected thereby.
Figure 2:
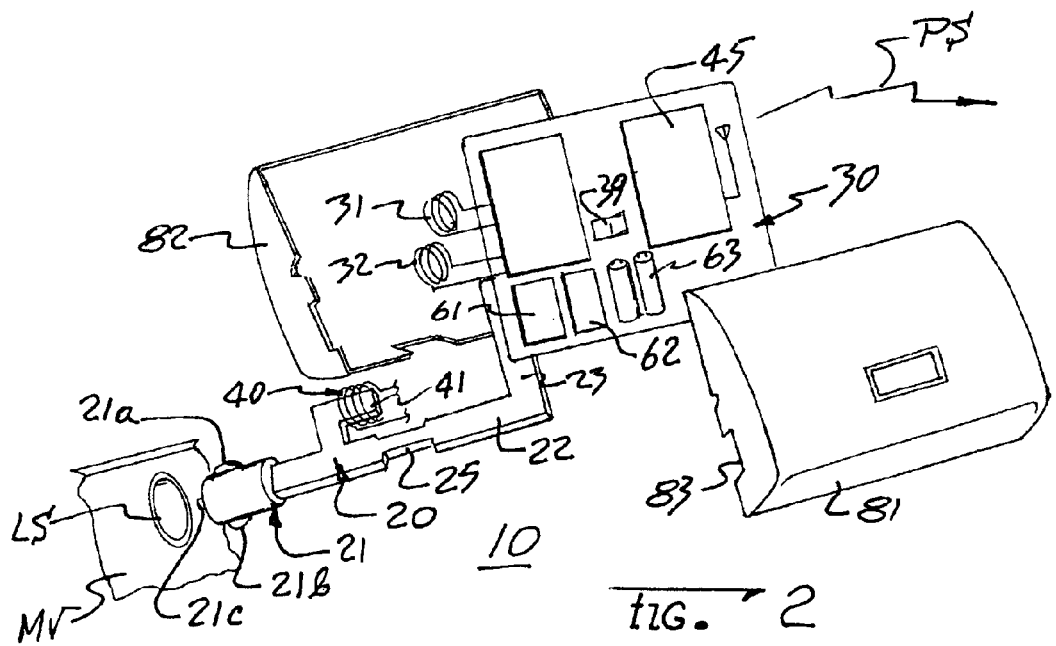
FIG. 2 is a further perspective illustration, separated by parts, of the mechanical aspects of the inventive vehicle alarm system.
Figure 3:
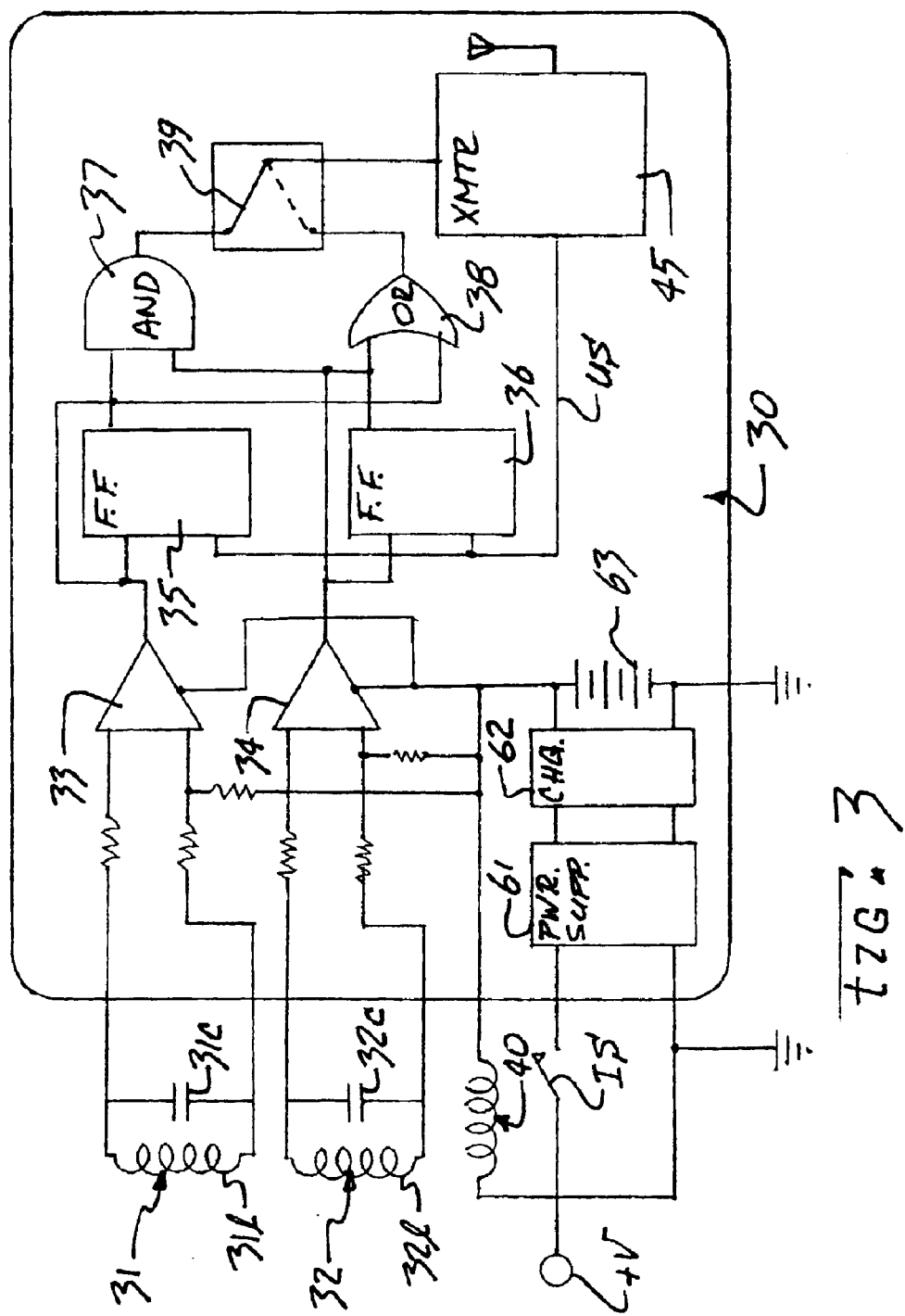
FIG. 3 is a diagrammatic circuit schematic depicting the electrical aspects of the inventive vehicle alarm system.

As shown in FIGS. 1–3 the inventive vehicle alarm system, generally designated by the numeral 10, comprises a portable sending unit 20 conformed for cantilevered insertion into a cigarette lighter socket LS of a motor vehicle MV for obtaining power to issue a paging signal PS to a remote pager 50 upon any vehicle movement that may be associated with unauthorized entry. To effect this function sending unit 20 includes a circuit board 30 mounted on an arm 23 that extends generally orthogonally from a beam 22 which, in turn, terminates at the other end in a conventional cigarette lighter contact insert 21. By conventional practice insert 21 is of a cylindrical shape conformed for mating fit within the interior of socket LS and includes laterally opposed spring contacts 21a and 21b and an axial contact terminal 21c at the free end thereof aligned respectively to make contact with the grounded interior side surface of the socket with the axial contact 21c then being brought into end contact to complete the circuit with the positive vehicle battery potential +V upon full insertion.

The foregoing structural arrangement results in a mounted deployment in which the mass is both cantilevered at the end of a beam and is also eccentrically displaced relative its elastic center. Thus at least two modes of harmonic motion can be achieved in the structure by controlling the various geometric and elastic parameters. To achieve this beam 22 is shaped over a portion thereof as a reduced section 25 located between insert 21 and board 30 and it is this beam flexure and torsional elasticity together with the length of arm 23 that deploys the center of mass CM1 of board 30 that define these harmonics.

Those skilled in the art will appreciate that any spring-mass first harmonic frequency generally follows an inverse of the exponential function of the ratio of the spring rate divided by the mass or torsional moment of inertia. The beam bending spring rate, in turn, is defined by the elastic modulus, the sectional area and the length of beam section 25 and the torsional spring rate is also defined by the same parameters. Thus the two harmonics are easily separated by selecting the length of the orthogonal arm 23. In this manner two distinct mechanical harmonics are conveniently accommodated that can be sufficiently separated to limit any cross coupling secondary effects. These two well separated harmonics are shown as the beam bending frequency FB1 and the torsional frequency TB1 and it is these two frequencies that are also selected to fall in the range of any vehicle motion caused by an intrusion. These two frequencies are therefore also selected as the first resonances of two tank circuits 31 and 32 positioned on board 30 in field sensing alignment adjacent a projecting core 41 of an electromagnet 40 again supported by fitting 21. Selection of these tank circuit resonances are again well known, each tank circuit being configured as a capacitively loaded inductor shown by way of inductor 31L and capacitor 31C forming tank circuit 31 and similarly inductor 32L and capacitor 32C forming circuit 32. In this manner well known, and therefore reliable, techniques are utilized.

Each of the tank circuits 31 and 32 is then connected across its corresponding. comparator 33 and 34 and if the comparison level is met each comparator then latches its corresponding latch 35 and 36, the outputs of both being then collected at the input of an AND gate 37 and also an OR gate 38. A manual switch 39 then selects which logical combination effected by these gates is fed to a transmitter stage 45 that then begins its sequence resulting in the call signal to the remote pager 50. When the transmitter stage 45 completes the call it then returns an unlatch signal US back to the two latches 35 and 36, thus rearming the portable alarm stage 20 for the next event. Of course, the user that is carrying the pager 50 then responds to the audio or vibratory pager signal and by observing the source number or message that has called can then determine the existence of a possible intrusion.

While the operative aspects of the inventive alarm system have been fully described above one will appreciate that good design practices require that the electrical components be properly housed. This enclosure is effected by a split housing 80, both shells 81 and 82 forming same being attached respectively to the front and back of the circuit board 30 to extend onto and over the reduced beam section 25 and the electromagnet 40 adjacent thereto. This housing structure then provides an enlarged opening 83 through which beam 22 extends and which therefore accommodates both the torsional and beam bending modes TB1 and FB1 described herein. In this form the response modes are conveniently achieved while the housing 80 itself may be useful to determine the weight and location of the center of mass CM1. Moreover, this mass may be selected such that the free motion of the beam 22 with the fitting 21 unconstrained, i.e., removed from the lighter socket, will produce a harmonic matching the higher frequency one of the two harmonics FB1 or TB1 rendering the device useful as a motion monitor of a briefcase or suitcase.

Those skilled in the art will further appreciate that while there are many ways in effecting the foregoing operation a regulated power supply 61 will be required for the several electronics components on the board 30. This power supply may then be combined with a charging circuit 62 charging an internal battery 63 which is then useful in those motor vehicles in which the lighter socket LS is connected in series with the ignition switch IS, thereby preserving the necessary excitation to power the alarm once a vehicle of this kind is shut down. In this manner the vehicle power is used solely to charge the inventive device allowing the further use of the alarm as a signaling device that may be used with a briefcase or other suitcase to protect its contents when left in a hotel room. In this manner the device obtains a wide range of usefulness, further assuring that it will become a widely used accessory for those of us that need to travel.

Obviously, many modifications and variations can be effected without departing from the spirit of the invention instantly disclosed. It is therefore intended that the scope of the invention be determined solely by the claims appended hereto.

I claim:

1. An alarm system deployable from the cigarette lighter socket of a motor vehicle and conformed to sense motions imparted to said vehicle in the course of an intrusion and to issue an alarm signal to a remote paging unit, comprising:

a flexible beam structure deployable in cantilever from said lighter socket and including a magnetic portion adjacent said lighter socket; and an electrical assembly secured to the free end of said beam structure and including a tank circuit means deployed in inductive proximity with said magnet to sense the movement of said electrical assembly relative said magnet, said electrical assembly further including a remote sending unit operatively connected to said tank circuit means for issuing said alarm signal upon the exceedance of said movement above a selected level.

2. Apparatus according to claim 1, wherein:

said movement of said electrical assembly includes at least a bending mode and a torsional mode each of a fundamental frequency different from the other; and said tank circuit means includes individual tank circuits each conformed to sense a the exceedance of the amplitudes of the respective one of said fundamental frequencies of each said modes.

3. Apparatus according to claim 2, further comprising:

logic means interposed between said tank circuit means and said remote sending unit for logically combining the exceedances sensed by said individual tank circuits.

4. Apparatus according to claim 3, wherein:

said logic means is conformed to combine said exceedances in a logical AND combination.

5. Apparatus according to claim 3, wherein:

said logic means is conformed to combine said exceedances in a logical OR combination.

6. Apparatus according to claim 3, wherein:

said logic means is conformed to combine said exceedances in a logical AND and a logical OR combination.

7. Apparatus according to claim 6, further comprising:

a manually operable selection switch interposed between said logic means and said remote sending unit for accommodating manual selection of either one of said logical AND or said logical OR combinations.

8. Apparatus according to claim 1, wherein:

said magnetic portion includes an electromagnet.

9. An alarm system deployable for charging from an electrical outlet and conformed to sense motions imparted to a secured container in the course of an intrusion and to issue an alarm signal to a remote paging unit, comprising:

a flexible beam structure deployed in cantilever and including a magnetic portion adjacent one end thereof;

an electrical assembly secured to the other end of said beam structure and including a tank circuit means deployed in inductive proximity with said magnet to sense the movement of said electrical assembly relative said magnet, said electrical assembly further including a remote sending unit operatively connected to said tank circuit means for issuing said alarm signal upon the exceedance of said movement above a selected level; and electric power storage means connected to said electrical assembly and conformed for connection to said electrical outlet.

10. Apparatus according to claim 9, wherein:

said movement of said electrical assembly includes at least a bending mode and a torsional mode each of a fundamental frequency different from the other; and said tank circuit means includes individual tank circuits each conformed to sense a the exceedance of the amplitudes of the respective one of said fundamental frequencies of each said modes.

11. Apparatus according to claim 10, further comprising:

logic means interposed between said tank circuit means and said remote sending unit for logically combining the exceedances sensed by said individual tank circuits.

12. Apparatus according to claim 11, wherein:

said logic means is conformed to combine said exceedances in a logical AND combination.

13. Apparatus according to claim 11, wherein:

said logic means is conformed to combine said exceedances in a logical OR combination.

14. Apparatus according to claim 11, wherein:

said logic means is conformed to combine said exceedances in a logical AND and a logical OR combination.

15. Apparatus according to claim 14, further comprising:

a manually operable selection switch interposed between said logic means and said remote sending unit for accommodating manual selection of either one of said logical AND or said logical OR combinations.

16. Apparatus according to claim 9, wherein:

said magnetic portion includes an electromagnet.

* * * * *